United States Patent
Young et al.

(10) Patent No.: US 11,930,005 B2
(45) Date of Patent: Mar. 12, 2024

(54) ANTI-PHISH, PERSONALIZED, SECURITY TOKEN TO AUTHENTICATE ELECTRONIC COMMUNICATIONS IN THE META VERSE

(71) Applicant: Bank of America Corporation, Charlotte, NC (US)

(72) Inventors: Michael Young, Davidson, NC (US); Vinesh Patel, London (GB); Melissa Gordon Glenn, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 239 days.

(21) Appl. No.: 17/713,411

(22) Filed: Apr. 5, 2022

(65) Prior Publication Data
US 2023/0319030 A1  Oct. 5, 2023

(51) Int. Cl.
*H04L 9/40* (2022.01)
*G06F 3/0482* (2013.01)

(52) U.S. Cl.
CPC ........ *H04L 63/0853* (2013.01); *G06F 3/0482* (2013.01); *H04L 63/1483* (2013.01)

(58) Field of Classification Search
None
See application file for complete search history.

(56) References Cited

U.S. PATENT DOCUMENTS

| | | |
|---|---|---|
| 7,290,035 B2 | 10/2007 | Mattathil |
| 7,802,298 B1 * | 9/2010 | Hong ................ G06F 21/51 713/192 |
| 7,841,003 B1 | 11/2010 | Emdee |
| 10,609,072 B1 | 3/2020 | Weldon |
| 10,931,709 B2 | 2/2021 | Parekh |
| 11,381,598 B2 * | 7/2022 | Nunes ............... H04L 63/20 |
| 11,546,377 B2 * | 1/2023 | Boshmaf ........... H04L 63/0227 |
| 11,882,112 B2 * | 1/2024 | Keiter .............. H04L 63/083 |

(Continued)

OTHER PUBLICATIONS

"USAA Suspicious Emails," https://www.usaa.com/inet/wc/security_strange_email#:~:text=Cybercriminals%20may%20try%20and%20trick.to%20every%20email%20we%20send, USAA, Retiieved on Jan. 24, 2022.

(Continued)

*Primary Examiner* — Jeffrey R Swearingen
(74) *Attorney, Agent, or Firm* — Weiss & Arons LLP

(57) ABSTRACT

Methods for securing an electronic communication is provided. Methods may include, in a registration process, creating and/or selecting an anti-phish, personalized, security token for a predetermined avatar. Methods may include, in the registration process, storing the token in a database. Methods may include, in an in-use process, generating an electronic communication at a virtual kiosk in a metaverse. Methods may include, in the in-use process, forwarding an electronic communication from the virtual kiosk to the avatar. The avatar may be associated with the account. Methods may include, in the in-use process, intercepting the communication at an edge interface. Methods may include, in the in-use process, selecting, from the database, the anti-phish, personalized, security token that is associated with the account. Methods may include, in the in-use process, injecting the selected token into the communication. Methods may include, in the in-use process, transmitting the communication with the token to the avatar.

23 Claims, 5 Drawing Sheets

(56) References Cited

U.S. PATENT DOCUMENTS

| | | | |
|---|---|---|---|
| 2017/0230416 A1* | 8/2017 | Sabarish | H04L 63/0807 |
| 2021/0211462 A1 | 7/2021 | Birch et al. | |
| 2022/0070215 A1* | 3/2022 | Stolfo | H04L 63/1491 |
| 2022/0116420 A1* | 4/2022 | Weber | H04L 63/1483 |
| 2022/0385648 A1* | 12/2022 | Keiter | H04L 63/1483 |
| 2022/0385693 A1* | 12/2022 | Keiter | H04L 63/306 |
| 2023/0291765 A1* | 9/2023 | Young | H04L 63/1483 |
| 2023/0319029 A1* | 10/2023 | Young | H04L 63/0853 |
| | | | 726/6 |

OTHER PUBLICATIONS

"What Is an Email Header ?- Guide," https://sendpulse.com/support/glossary/email-header, SendPulse, Retrieved on Mar. 21, 2022.
"What Is an Email Header?" https://whatismyipaddress.com/email-header, CGP Holdings, Inc., Retrieved on Mar. 21, 2022.

* cited by examiner

TWO-WAY ANTI-PHISH TOKEN

ANTI-PHISH PERSONALIZED SECURITY TOKENS

Anti-Phish "89898989#" — 302

Anti-Phish  — 304

Anti-Phish Animation of:  — 306

Anti-Phish rotating Pictures of:  — 308

Anti-Phish rotating Videos of:  — 310

Anti-Phish
numerical portion: 6543
audio portion: 🔊 click to listen
Visual Portion: rotating uploaded photos — 312

ANTI-PHISH, PERSONALIZED, SECURITY TOKEN TO AUTHENTICATE ELECTRONIC COMMUNICATIONS IN THE META VERSE

FIELD OF TECHNOLOGY

Aspects of the disclosure relate to electronic communication security.

BACKGROUND OF THE DISCLOSURE

The metaverse is an internet-based virtual world that mimics aspects of the physical world. The metaverse uses technologies such as virtual reality ("VR"), augmented reality ("AR"), artificial intelligence ("AI"), social media and digital currency.

The internet may be compared to the metaverse. One comparison between the internet and the metaverse may be that a user can browse the internet, while, to an extent, a user can live in the metaverse.

A user communicates in the metaverse using an avatar. An entity is represented within the metaverse as virtual kiosk. The avatar, representing the user, communicates with various virtual kiosks, representing various entities. Because the avatar represents the user and the virtual kiosks represents an entity, there is a large possibility for malicious activity that impersonates either the user or the entity.

Those of malicious intent may impersonate a legitimate entity or user within the metaverse. An illegitimate entity impersonating a legitimate entity may instruct an illegitimate avatar impersonating the legitimate entity to transfer funds to an account associated with the illegitimate entity. An illegitimate avatar impersonating a legitimate avatar may instruct illegitimate transactions to be executed by a legitimate entity. Such illegitimate instructions may include illegitimate funds transfer.

Therefore, it would be desirable for instructions and communications within the metaverse to be self-authenticating. As such, an anti-phish, personalized, security token may be injected into each electronic communication originating from a legitimate entity and/or from a legitimate avatar within the metaverse. The anti-phish, personalized, security token may increase the confidence of the receiving entity or avatar regarding the validity of the electronic communication.

SUMMARY OF THE DISCLOSURE

Apparatus and methods for securing electronic communications within a metaverse is provided. Methods may include a registration process, in which a user registers for an anti-phish security protocol. Methods may include an in-use process, in which an enterprise generates electronic communications, injects the electronic communications with an anti-phish token for each recipient and transmits the electronic communications to one or more recipients.

During the registration process, methods may include creating and/or selecting an anti-phish, personalized, security token for a predetermined avatar. During the registration process, methods may include presenting, to the user associated with the predetermined avatar and/or to the avatar itself, a plurality of selectable options for the anti-phish, personalized, security token. The plurality of selectable options may include a numeric code, a photograph, a plurality of photographs, an animation, a plurality of animations and/or any suitable combination of the above-stated options. The plurality of selectable options may be associated with a theme. The plurality of selectable options may enable a user to upload one or more photographs and/or one or more animations.

The plurality of selectable options may include a dynamically-rotating digital artwork file linked to a non-fungible token ("NFT"). The dynamically-rotating file may rotate on a predetermined schedule and/or randomly.

The presentation of the selectable options may be executed on a mobile device displaying a webpage. The webpage may be associated with the enterprise. The presentation of the selectable options may be executed by a virtual kiosk within the metaverse.

During the registration process, methods may include receiving from the one or more users a selection of an option, included in the plurality of selectable options.

During the registration process, methods may include communicating the anti-phish, personalized, security token to an enterprise associated with a virtual kiosk within the metaverse. Methods may also include registering the selected option with the enterprise. The registering may include storing the anti-phish, personalized, security token in a database associated with the enterprise.

There may be an in-use process. The in-use process may involve the avatar approaching the virtual kiosk within the metaverse. The virtual kiosk may generate an electronic communication directed to the avatar. The electronic communication may be forwarded from the virtual kiosk to the avatar.

An interface may intercept the electronic communication. The interface may communicate with the database. The interface may select the anti-phish, personalized, security token that is associated with the predetermined avatar.

The interface may inject the selected anti-phish, personalized, security token into the electronic communication. The electronic communication, with the injected anti-phish, personalized, security token, may be communicated to the predetermined avatar.

The virtual kiosk and/or the interface may receive a confirmation from the predetermined avatar that the anti-phish, personalized, security token is valid. Upon validation, an authenticated session may be created and/or instantiated between the predetermined avatar and the virtual kiosk.

In some embodiments, two anti-phish, personalized, security tokens may be used. In such embodiments, a first token may be used to authenticate the avatar to the enterprise, while the second token may be used to authenticate the enterprise to the avatar. Both the first token and the second token may be registered during the registration process. Both the first token and the second token may be selected, uploaded and/or created by a user associated with the avatar.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1A:
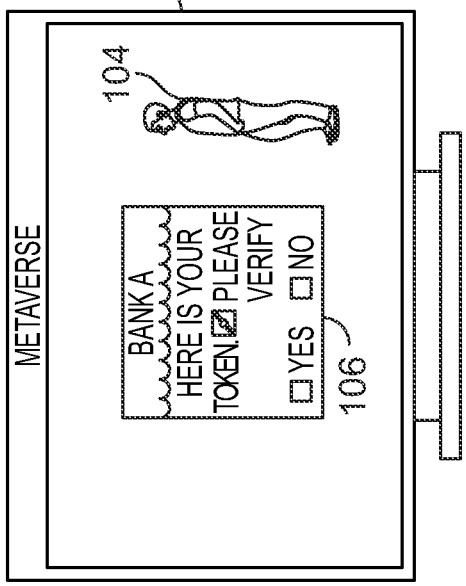
FIGS. 1A, 1B, 1C and 1D show illustrative diagrams in accordance with principles of the disclosure.

Apparatus and methods for securing electronic communications is provided. The system may include a virtual kiosk. The virtual kiosk may be located with the metaverse. The virtual kiosk may represent an entity. The virtual kiosk may be in communication with one or more entity databases. The one or more entity database may be linked to one or more entity hardware processors and/or one or more entity servers. The system may also include an avatar. The avatar may be located within the metaverse. The avatar may represent a user. The avatar may be in communication with the user.

During the registration process, the one or more entity servers, linked to the one or more entity databases and the one or more entity hardware processors, may receive a request from the user. The request may be to opt-in to an anti-phish, personalized, security protocol. The anti-phish, personalized, security protocol may include transmitting an anti-phish, personalized, security token with each electronic communication communicated from the virtual kiosk to the avatar.

During the registration process, the one or more entity servers may display a plurality of selectable options for the anti-phish, personalized, security token. The one or more entity servers may receive a selection of an option for the anti-phish, personalized, security token. The option may be included in the plurality of selectable options. The one or more entity servers may register the selected option and link the selected option to a profile associated with the user. The one or more entity servers may store the anti-phish, personalized, security token linked to the profile associated with the user in the one or more databases.

During an in-use process, the avatar may approach the virtual kiosk. The virtual kiosk may generate an electronic communication. A recipient of the electronic communication may be the avatar. The virtual kiosk may forward the electronic communication to the avatar.

An edge interface may intercept the electronic communication. The edge interface may be associated with the virtual kiosk. The edge interface may retrieve the anti-phish, personalized, security token linked to the profile associated with the user. The edge interface may populate the electronic communication with the anti-phish, personalized, security token. The edge interface may forward the electronic communication to the avatar.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIGS. 1A, 1B, 1C and 1D show illustrative diagrams. The illustrative diagrams show communications between an avatar and a virtual kiosk in a metaverse.

FIG. 1A shows a communication occurring within metaverse 102. Within metaverse 102, avatar 1236, shown at 104, may approach virtual kiosk 106. Virtual kiosk 106 may represent Bank A. Avatar 1236 may represent a user. Avatar 1236 may intend to execute transactions at virtual kiosk 106. Prior to enabling avatar 1236 to execute transactions at virtual kiosk 106, virtual kiosk 106 may authenticate avatar 1236. The authentication process may include various steps, such as username and password entry and one-time password ("OTP") entry. As part of the authentication process, avatar 1236 may present an anti-phish token to the virtual kiosk. In embodiments where multiple tokens are used, the anti-phish token may be a first anti-phish token.

The anti-phish, personalized, security token may be a dynamic and/or static, encrypted and/or non-encrypted, personalized electronic component that acts as a quick visual aid and indicates a level of confidence that the communication is indeed from an avatar and/or the enterprise. The electronic component may be selected by a user associated with the avatar or the entity associated with the virtual kiosk.

The electronic component may include one or more of the following, a numeric code, a photograph, an animation, a plurality of photographs, a plurality of animations any other suitable data element. The electronic component may dynamically select a photograph that relates to a pre-selected theme. As such, the user associated with the avatar or the entity associated with the virtual kiosk may select a theme, such as famous skyscrapers. The token may retrieve a photograph or an animation of a famous skyscraper from a plurality of photographs or from a network search, such as an Internet search. As such, the anti-phish, personalized, security token may appear different each time an electronic communication is transmitted from the transmitting entity to the recipient. For example, the anti-phish, personalized, security token may include a different photograph each time an electronic communication is communicated from the avatar to the enterprise or from the enterprise to the avatar.

Even though a single communication may be transmitted to multiple recipients, such as in generic communications, the anti-phish, personalized, security token may be individual for each recipient. As such, after the electronic communication has been generated and transmitted, an intercepting edge component may inject the personalized token into each individual electronic communication.

Figure 1C:
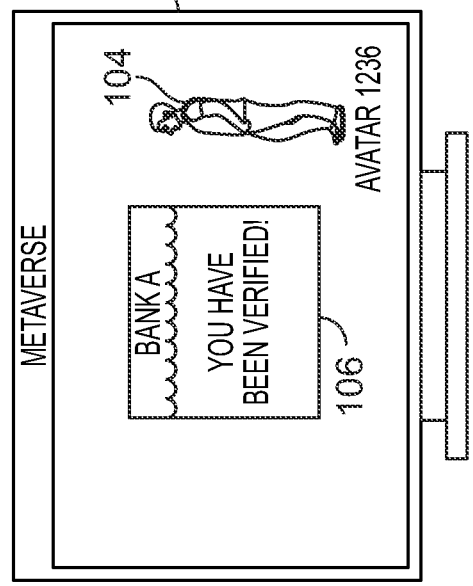
Figure 1B:
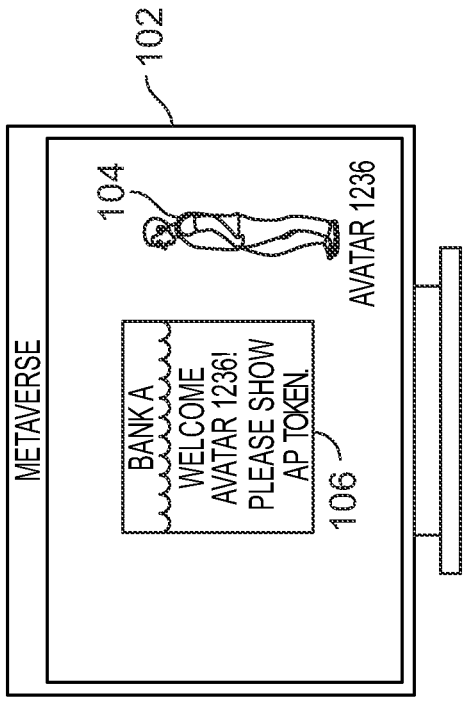

FIG. 1B shows that virtual kiosk 106 has verified the anti-phish token of avatar 1236. As such, there may be a level of confidence between the virtual kiosk 106 and avatar 1236 that avatar 1236 indeed represents a specific user. Once the authentication from the virtual kiosk 106 to avatar 1236 is completed, another level of verification may be applied.

FIG. 1C shows a second level of verification. Virtual kiosk 106 may display a second anti-phish token to avatar 104. The second anti-phish token may be different from the first anti-phish token. The second anti-phish token may be the same as the first anti-phish token. The second anti-phish token may be selected by the user that is represented by avatar 104.

The second anti-phish, personalized, security token may be a dynamic and/or static, encrypted and/or non-encrypted, personalized electronic component that acts as a quick visual aid and indicates a level of confidence that the communication is indeed from an avatar and/or the enterprise. The electronic component may be selected by a user associated with the avatar or an entity associated with the enterprise.

The electronic component may include one or more of the following, a numeric code, a photograph, an animation, a plurality of photographs, a plurality of animations any other suitable data element. The electronic component may dynamically select a photograph that relates to a pre-selected theme. As such, a communication recipient and/or recipient may select a theme, such as famous skyscrapers, and the token may retrieve a photograph or animation of a famous skyscraper from a plurality of photographs or from a network search, such as an Internet search. As such, the anti-phish, personalized, security token may appear different each time an electronic communication is transmitted from the transmitting entity to the recipient. For example, the anti-phish, personalized, security token may include a different photograph each time an electronic communication is communicated from the avatar to the enterprise or from the enterprise to the avatar.

Even though a single communication may be transmitted to multiple recipients, such as in generic communications, the anti-phish, personalized, security token may be individual for each recipient. As such, after the electronic communication has been generated and transmitted, an intercepting edge component may inject the personalized token into each individual electronic communication.

Avatar 1236 may select the yes button to verify the second anti-phish token. Avatar 1236 may select the no button to indicate that the second anti-phish token is unrecognized, and therefore, verification has failed.

Figure 1D:
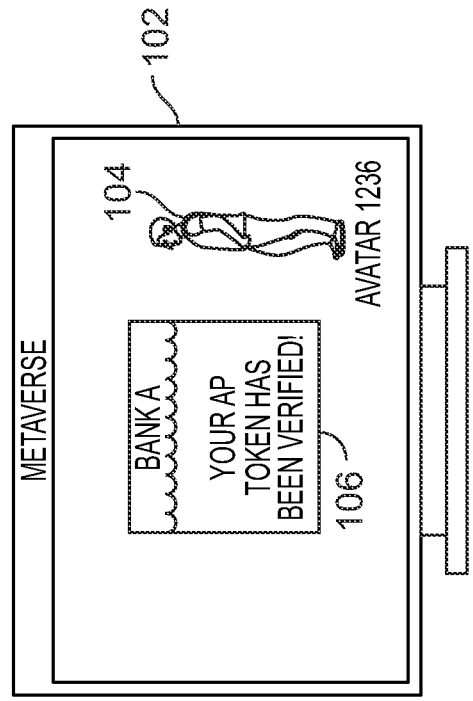

FIG. 1D shows another communication in metaverse 102. In event that avatar 1236 selected the yes button shown in FIG. 1C, an authentication session may be initiated. Once the first anti-phish token and the second anti-phish token have been verified, the authenticated session may be initiated between avatar 1236 and virtual kiosk 106. The authenticated session may enable avatar 1236 to execute transactions at virtual kiosk 106.

Figure 2:
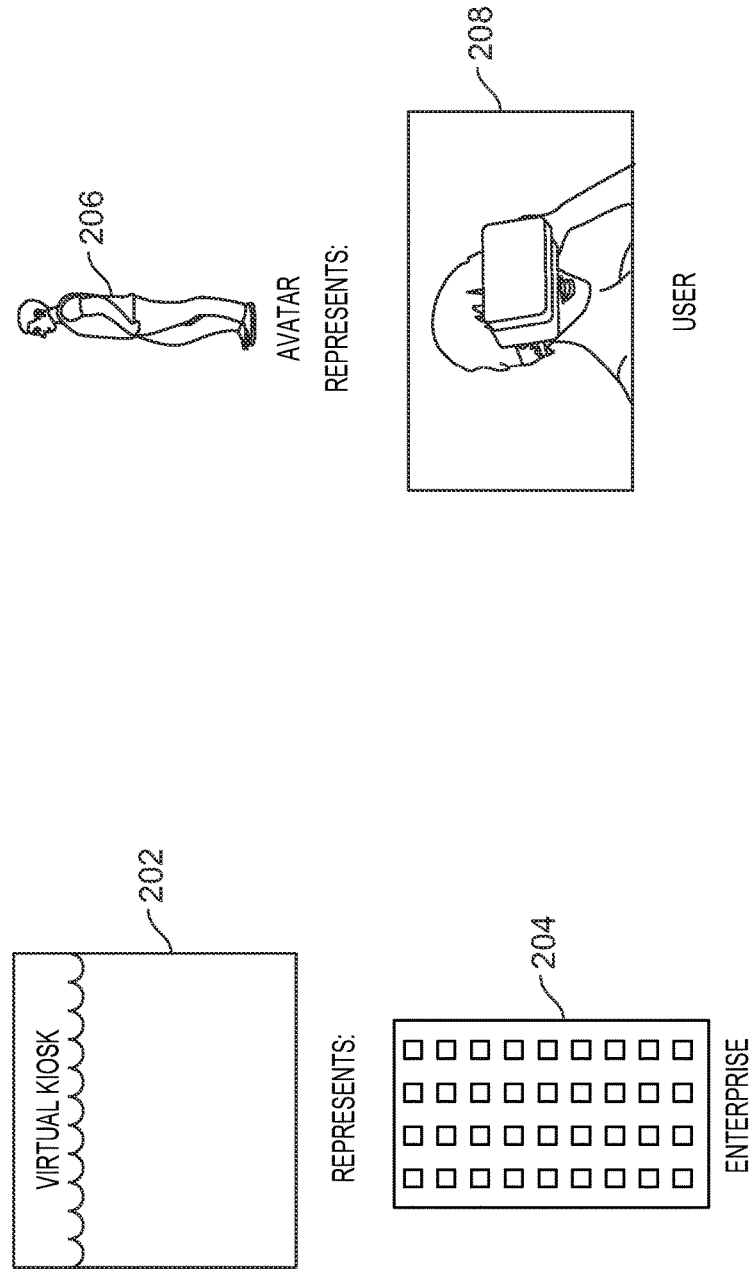
FIG. 2 shows another illustrative diagram in accordance with principles of the disclosure.

FIG. 2 shows an illustrative diagram. In the metaverse, virtual kiosk 202 may represent enterprise 204. In the metaverse, avatar 206 may represent a user 208.

Figure 3:
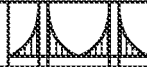
FIG. 3 shows yet another illustrative diagram in accordance with principles of the disclosure.
Figure 3:
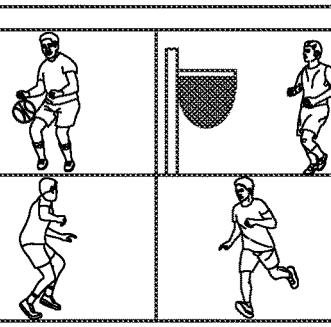
Figure 3:
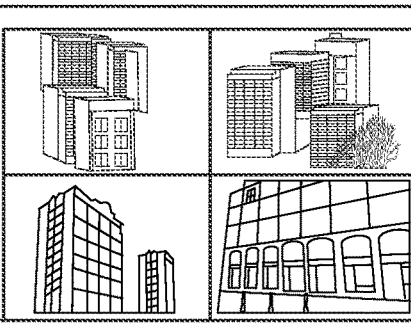
Figure 3:
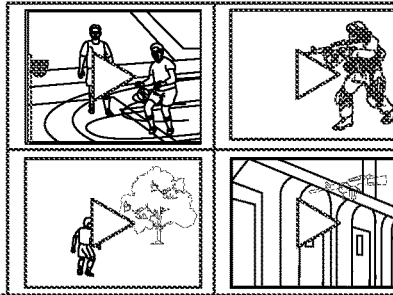

FIG. 3 shows another illustrative diagram. The illustrative diagram shows exemplary variations of an anti-phish, personalized, security token. It should be appreciated that a user may select any suitable combination of characters, digits, pictures, animations, audio clips and any suitable rotating characters, digits, pictures, animations, audio clips.

An anti-phish token may be a group of characters, as shown at 302. An anti-phish token may be a picture, as shown at 304. An anti-phish token may be animation of a selected sports players, as shown at 306.

An anti-phish token may be rotating pictures of cities in a specific geographical location, as shown at 308. An anti-phish token may be rotating videos of sports events related to a specific sports team, as shown at 310. An anti-phish token may be a combination of a numerical portion, an audio clip and rotating uploaded photos, as shown at 312.

Figure 4:
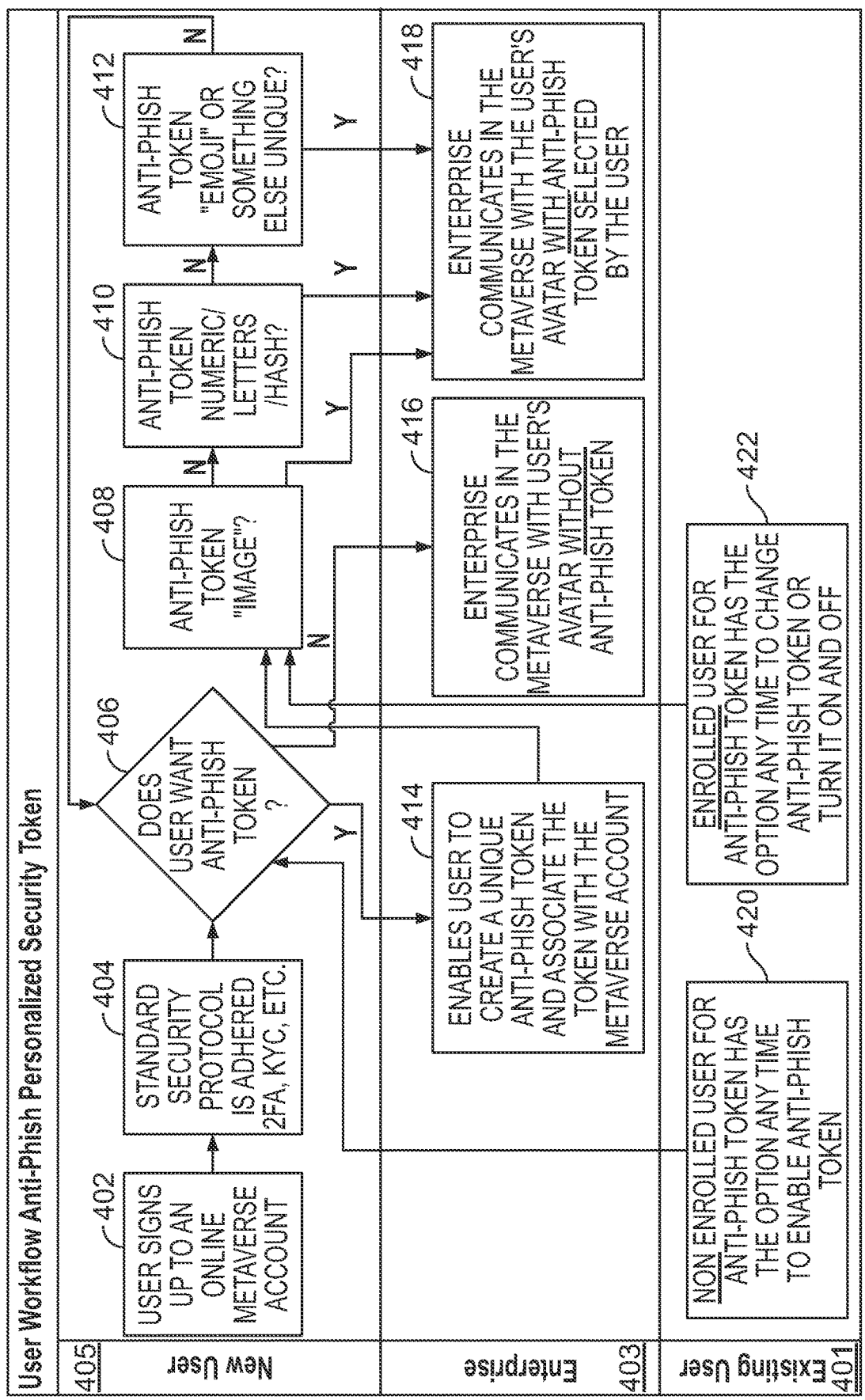
FIG. 4 shows an illustrative flow chart in accordance with principles of the disclosure.

FIG. 4 shows an illustrative flow chart. The flow chart relates to a user workflow for an anti-phish, personalized, security token. There may be three swim lanes (or any other suitable number of swim lanes), a new user swim lane 405, an enterprise swim lane 403 and an existing user swim lane 401.

A new user may sign up for an online metaverse account, as shown at 402. The online metaverse account may be opened using a computing apparatus, such as mobile device or personal computer ("PC"). The online account may be opened using an avatar, representing the user, communicating with a virtual enterprise kiosk in the metaverse. The computing apparatus or avatar may communicate with an enterprise server or virtual kiosk. The online metaverse account may be an account associated with an enterprise. Such an enterprise may be indicated by swim lane 403.

Standard security protocols may be adhered to when opening the account, as shown at 404. Such security protocols may include two-factor authentication ("2FA") and know your customer ("KYC") protocols.

The enterprise server or virtual kiosk may query the user whether the user wants to enroll in an anti-phish security protocol, as shown at 406. Enrolling in an anti-phish security protocol may involve receiving an anti-phish token with metaverse communications. It should be noted that an existing user, who is not enrolled in an anti-phish security protocol, may have the option to enable an anti-phish security protocol at any time, as shown at 420.

In the event that a user does want to enroll in the anti-phish security protocol, enterprise 403 may enable the user to create a unique anti-phish token and associate the unique anti-phish token with the account, as shown at 414. The user may select an anti-phish token image, as shown at 408, an anti-phish token numeric, letters and/or hash, as shown at 410, and an anti-phish token emoji or any other unique item, as shown at 412. Enterprise 403 may also enable a user to invoke an anti-phish generation algorithm. Such an anti-phish generation algorithm may generate a numeric code and/or photograph that may be specific to the user. The numeric code and/or photograph may be based on historical interne searches and/or other suitable information.

Once the anti-phish token is selected, the enterprise may communicate with the user's avatar in the metaverse with the anti-phish token selected by the user, as shown at 418.

In the event that the user does not want an anti-phish token associated with the account, the enterprise may send electronic communications to the user without the anti-phish token, as shown at 416. Additionally, a user that is enrolled in the anti-phish token security protocol may have the option to change the anti-phish token or turn it on or off at any time, as shown at 422.

Figure 5:
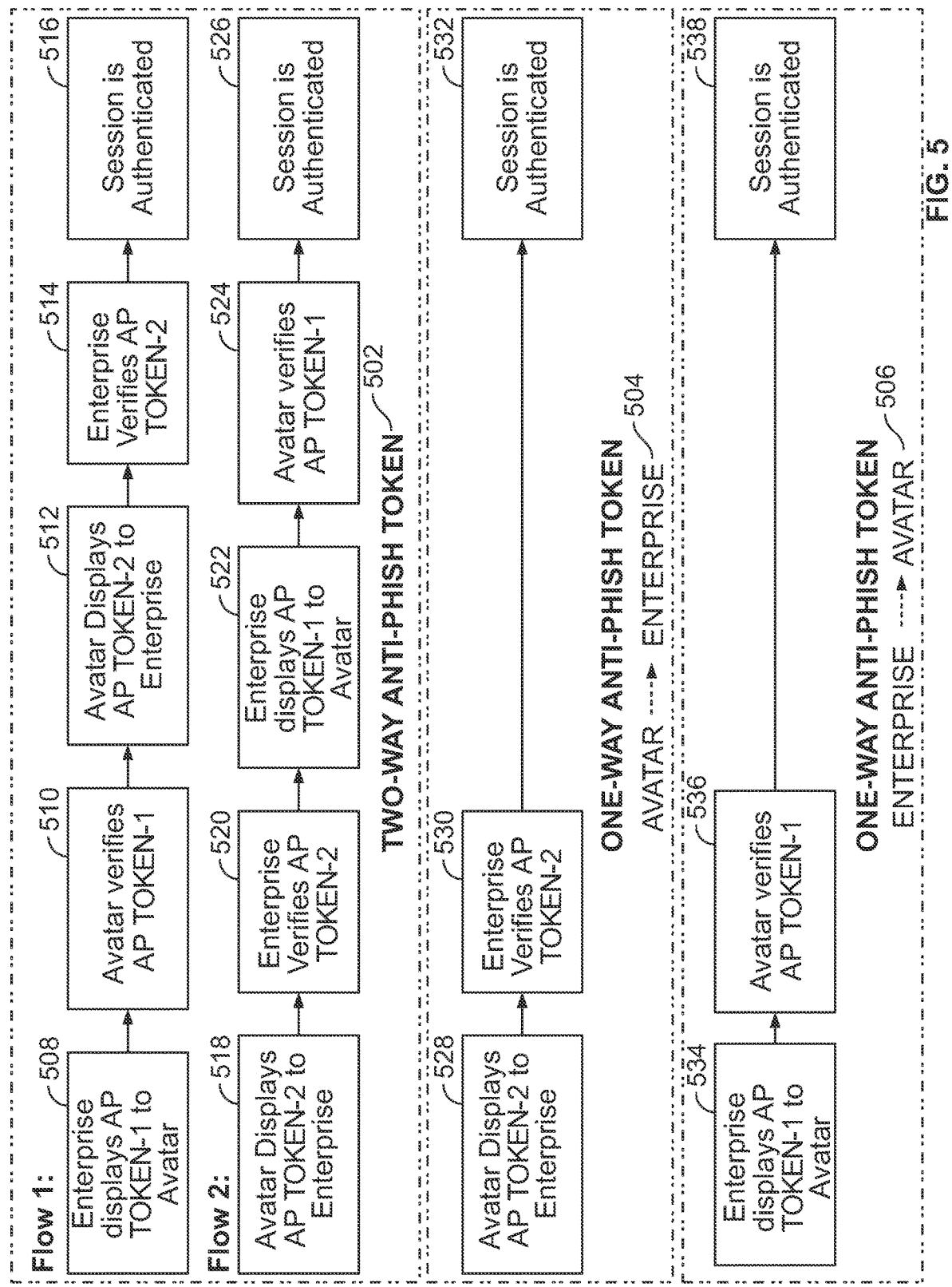
FIG. 5 shows another illustrative flow chart in accordance with principles of the disclosure.

FIG. 5 shows an illustrative flow chart. The illustrative flow chart shows two flows for a two-way anti-phish token, shown at 502. The illustrative flow chart shows a flow for a one-way anti-phish token between an avatar and an enterprise, shown at 504. The illustrative flow chart shows a flow for a one-way anti-phish token between the enterprise and the avatar, shown at 506. It should be appreciated that the enterprise may be represented by a virtual kiosk in a metaverse.

Step 1 of flow 1 of the two-way, anti-phish token includes an enterprise displaying a first anti-phish token to an avatar, as shown at 508. Step 2 of flow 1 of the two-way, anti-phish token includes an avatar verifies the first anti-phish token, as shown at 510. Step 3 of flow 1 of the two-way, anti-phish token includes an avatar displays the second anti-phish token to the enterprise, as shown at 512. Step 4 of flow 1 of the two-way, anti-phish token includes the enterprise verifies the second anti-phish token. Upon completion of step 4, the session is authenticated, as indicated at 516.

Step 1 of flow 2 of the two-way, anti-phish token includes an avatar displays the second anti-phish token to the enterprise, as shown at 518. Step 2 of flow 2 of the two-way, anti-phish token includes the enterprise verifies the second anti-phish token, as shown at 520. Step 3 of flow 2 of the two-way, anti-phish token includes the enterprise displays the first anti-phish token to the avatar, as shown at 522. Step 4 of flow 2 of the two-way, anti-phish token includes the avatar verifies the first anti-phish token, as shown at 534. Upon completion of step 4, the session is authenticated, as indicated at 526.

Step 1 of the one-way, anti-phish token flow from an avatar to an enterprise includes an avatar displays a second anti-phish token to an enterprise, as shown at 528. Step 2 of the one-way, anti-phish token flow includes the enterprise verifies the second anti-phish token, as shown at 530. Upon completion of step 2, the session is authenticated, as shown at 532.

Step 1 of the one-way, anti-phish token flow from an enterprise to an avatar includes an enterprise displays the first anti-phish token to the avatar, as shown at 534. Step 2 of the one-way, anti-phish token flow includes the avatar verifies the first anti-phish token, as shown at 536. Upon completion of step 2, the session is authenticated, as shown at 538.

Thus, an anti-phish, personalized, security token to authenticate electronic communications in the metaverse. Persons skilled in the art will appreciate that the present invention can be practiced by other than the described embodiments, which are presented for purposes of illustration rather than of limitation. The present invention is limited only by the claims that follow.

What is claimed is:

1. A method for securing electronic communications within a metaverse, the method comprising:
   in a registration process:
      creating and/or selecting an anti-phish, personalized, security token for a predetermined avatar;
      communicating the anti-phish, personalized, security token to an enterprise associated with a virtual kiosk within the metaverse; and
      storing anti-phish, personalized, security token at a database associated with the enterprise;
   in an in-use process:
      approaching, by the predetermined avatar, the virtual kiosk within the metaverse;
      generating, at the virtual kiosk, an electronic communication directed to the avatar;
      forwarding the electronic communication from the virtual kiosk to the avatar;
      intercepting the electronic communication at an interface between the virtual kiosk and the avatar, said interface communicating with the database;
      selecting, by the interface, the anti-phish, personalized, security token that is associated with the predetermined avatar;
      retrieving, by the interface, the anti-phish, personalized, security token that is associated with the predetermined avatar;
      injecting the selected anti-phish, personalized, security token into the electronic communication;
      communicating the electronic communication, with the injected anti-phish, personalized, security token, to the predetermined avatar;
      receiving a confirmation from the predetermined avatar that the anti-phish, personalized, security token is valid; and
      creating an authenticated session between the predetermined avatar and the virtual kiosk.

2. The method of claim 1, wherein the anti-phish, personalized, security token comprises a numeric code.

3. The method of claim 1, wherein the anti-phish, personalized, security token comprises a plurality of photographs.

4. The method of claim 3, wherein the electronic communication displays to the avatar a selected photograph from among the plurality of photographs.

5. The method of claim 3, further comprising:
   generating a plurality of electronic communications at the virtual kiosk;
   forwarding the plurality of electronic communications to the predetermined avatar;
   intercepting the plurality of electronic communications at the interface;
   injecting the anti-phish, personalized, security token, said anti-phish, personalized, security token comprising a photograph, from the plurality of photographs, into each electronic communication included in the plurality of electronic communications, where each electronic communication, included in the plurality of electronic communications, displays to the predetermined avatar a different selected photograph from the plurality of photographs; and
   transmitting each electronic communication, with the injected anti-phish, personalized, security token, to the predetermined avatar.

6. The method of claim 3, wherein when there are a plurality of electronic communications transmitted from the virtual kiosk to the avatar, each electronic communication included in the plurality of electronic communications, displays a different selected photograph from the plurality of photographs.

7. The method of claim 1, wherein the anti-phish, personalized, security token comprises a category of photographs and/or animations.

8. The method of claim 1, wherein the anti-phish, personalized, security token comprises an encrypted link, the encrypted link is activated upon receipt of the electronic communication by the predetermined avatar, wherein upon activation of the encrypted link, a user-readable anti-phish, personalized, security token is retrieved from the database and displayed within the electronic communication.

9. A method for securing electronic communications within a metaverse, the method comprising:
   in a registration process:
      creating and/or selecting, by a user, at an internet location associated with an enterprise:
         a first anti-phish, personalized, security token to verify communications from a predetermined avatar to a predetermined enterprise, said predetermined avatar associated with the user, said predetermined enterprise associated with a virtual kiosk within the metaverse; and
         a second anti-phish, personalized, security token to verify communications from the predetermined enterprise to the predetermined avatar; and
      storing anti-phish, personalized, security token at a database associated with the enterprise;
   in an in-use process:
      approaching, by the predetermined avatar, the virtual kiosk within the metaverse, said approaching comprising presenting the first anti-phish, personalized, security token to the virtual kiosk;

verifying, by the virtual kiosk, the first anti-phish, personalized, security token;

generating, at the virtual kiosk, an electronic communication directed to the predetermined avatar;

forwarding the electronic communication from the virtual kiosk to the predetermined avatar;

intercepting the electronic communication at an interface between the virtual kiosk and the predetermined avatar, said interface communicating with the database;

selecting, by the interface, the second anti-phish, personalized, security token;

retrieving, by the interface, the second anti-phish, personalized, security token;

injecting the second anti-phish, personalized, security token into the electronic communication;

communicating the electronic communication, with the injected second anti-phish, personalized, security token, to the predetermined avatar;

receiving a confirmation from the predetermined avatar that the second anti-phish, personalized, security token is valid; and creating an authenticated session between the predetermined avatar and the virtual kiosk.

10. The method of claim 9, wherein the verifying includes the virtual kiosk communicating with the database.

11. The method of claim 9, wherein the first anti-phish, personalized, security token and/or the second anti-phish, personalized, security token comprises a numeric code.

12. The method of claim 9, wherein first anti-phish, personalized, security token and/or the second anti-phish, personalized, security token comprises a plurality of photographs.

13. The method of claim 12, wherein the electronic communication displays to the avatar a selected photograph from among the plurality of photographs.

14. The method of claim 12, further comprising:
generating a plurality of electronic communications at the virtual kiosk;
forwarding the plurality of electronic communications to the avatar;
intercepting the plurality of electronic communications at the interface;
injecting the second anti-phish, personalized, security token, said second anti-phish, personalized, security token comprising a photograph, from the plurality of photographs, into each electronic communication included in the plurality of electronic communications, where each electronic communication, included in the plurality of electronic communications, displays to the predetermined avatar a different selected photograph from the plurality of photographs; and
transmitting each electronic communication, with the injected second anti-phish, personalized, security token, to the predetermined avatar.

15. The method of claim 12, wherein when there are a plurality of electronic communications transmitted from the virtual kiosk to the avatar, each electronic communication included in the plurality of electronic communications, displays to the user a different selected photograph from the plurality of photographs.

16. The method of claim 9, wherein the anti-phish, personalized, security token comprises a category of photographs and/or animations.

17. The method of claim 9, wherein the anti-phish, personalized, security token comprises an encrypted link, the encrypted link is activated upon receipt of the electronic communication by the predetermined avatar, wherein upon activation of the encrypted link, a user-readable anti-phish, personalized, security token is retrieved from the database and displayed within the electronic communication.

18. A system for securing electronic communications within a metaverse, the system comprising:
a virtual kiosk located within the metaverse, said virtual kiosk represents an entity, said virtual kiosk in communication with one or more entity databases that are linked to one or more entity hardware processors and one or more entity servers; and
an avatar located within the metaverse, said avatar represents a user, said avatar in communication with the user;
wherein during a registration process:
the one or more entity servers, linked to the one or more entity databases and the one or more entity hardware processors, receives a request from the user, the request to opt-in to an anti-phish, personalized, security protocol, said anti-phish, personalized, security protocol comprising transmitting an anti-phish, personalized, security token with each electronic communication communicated from the virtual kiosk to the avatar;
the one or more entity servers displays a plurality of selectable options for the anti-phish, personalized, security token;
the one or more entity servers receives a selection of an option for the anti-phish, personalized, security token, the option included in the plurality of selectable options;
the one or more entity servers registers the selected option as linked to a profile associated with the user; and
the one or more entity servers stores, in the one or more databases, the anti-phish, personalized, security token linked to the profile associated with the user;
wherein during an in-use process:
the avatar approaches the virtual kiosk;
the virtual kiosk generates an electronic communication, where a recipient of the electronic communication is the avatar;
the virtual kiosk forwards the electronic communication to the avatar;
an edge interface associated with the virtual kiosk intercepts the electronic communication;
the edge interface retrieves the anti-phish, personalized, security token linked to the profile associated with the user;
the edge interface populates the electronic communication with the anti-phish, personalized, security token; and
the edge interface forwards the electronic communication to the avatar.

19. The system of claim 18, wherein the plurality of selectable options comprises a numeric code, a photograph, a plurality of photographs, an animation, a plurality of animations and/or a combination of the numeric code, photograph, plurality of photographs, animation and plurality of animations.

20. The system of claim 19, wherein the plurality of selectable options is associated with a theme.

21. The system of claim 18, wherein the plurality of selectable options comprises dynamically-rotating, digital-artwork file linked to a non-fungible token ("NFT"), said digital-artwork file that rotates on a predetermined schedule.

22. The system of claim 18, wherein the plurality of selectable options comprises dynamically-rotating digital artwork linked to a non-fungible token ("NFT") that rotates randomly.

23. The system of claim 18, wherein the plurality of selectable options enables the user to upload one or more photographs.

\* \* \* \* \*